United States Patent
Kleven et al.

(10) Patent No.: US 8,655,604 B2
(45) Date of Patent: Feb. 18, 2014

(54) MULTIVARIABLE PROCESS FLUID FLOW DEVICE WITH FAST RESPONSE FLOW CALCULATION

(75) Inventors: Lowell A. Kleven, Eden Prairie, MN (US); David E. Wiklund, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 1110 days.

(21) Appl. No.: 12/606,261

(22) Filed: Oct. 27, 2009

(65) Prior Publication Data

US 2010/0106433 A1    Apr. 29, 2010

Related U.S. Application Data

(60) Provisional application No. 61/108,625, filed on Oct. 27, 2008.

(51) Int. Cl.
*G01F 1/00* (2006.01)

(52) U.S. Cl.
USPC .......................................................... 702/47

(58) Field of Classification Search
USPC .......................................................... 702/47
See application file for complete search history.

(56) References Cited

U.S. PATENT DOCUMENTS

| | | | |
|---|---|---|---|
| 5,372,046 A | 12/1994 | Kleven et al. | 73/861.22 |
| 5,429,001 A | 7/1995 | Kleven | 73/861.22 |
| 5,606,513 A | 2/1997 | Louwagie et al. | 364/510 |
| 5,817,950 A | 10/1998 | Wiklund et al. | 73/861.66 |
| 5,825,664 A | 10/1998 | Warrior et al. | 364/550 |
| 5,899,962 A | 5/1999 | Louwagie et al. | 702/138 |
| 5,942,696 A | 8/1999 | Kleven | 73/861.22 |
| 6,151,557 A | 11/2000 | Broden et al. | 702/47 |
| 6,170,338 B1 | 1/2001 | Kleven et al. | 73/861.22 |
| 6,182,019 B1 | 1/2001 | Wiklund | 702/100 |
| 6,253,624 B1 | 7/2001 | Broden et al. | 73/861.44 |
| 6,311,568 B1 | 11/2001 | Kleven | 73/861.42 |

(Continued)

FOREIGN PATENT DOCUMENTS

| | | |
|---|---|---|
| EP | 1 081 472 | 3/2001 |
| JP | 3021735 U | 3/1995 |

(Continued)

OTHER PUBLICATIONS

First Office Action from corresponding Chinese patent application No. 2009801427213, dated Apr. 25, 2012.

(Continued)

*Primary Examiner* — Stephen Cherry
(74) *Attorney, Agent, or Firm* — Westman, Champlin & Koehler, P.A.

(57) ABSTRACT

A process fluid flow device includes process communication circuitry, a processor, and measurement circuitry. The process communication circuitry is configured to communicate with at least one additional process device. The processor is coupled to the process communication circuitry and is configured to execute instructions to provide a plurality of cycles, wherein each cycle includes a number of flow-related calculations. Measurement circuitry is operably coupleable to a plurality of process variable sensors to obtain an indication of differential pressure during each cycle, and to obtain static pressure, and process fluid temperature. The processor is configured to compute a process fluid flow value using a current differential pressure sensor indication and at least one flow-related value calculated during a previous cycle. The process communication circuitry communicates the computed process fluid flow value to the at least one additional process device.

26 Claims, 8 Drawing Sheets

(56) References Cited

U.S. PATENT DOCUMENTS

| | | |
|---|---|---|
| 6,484,590 B1 | 11/2002 | Kleven et al. ............... 73/861.22 |
| 6,622,573 B2 | 9/2003 | Kleven ....................... 73/861.42 |
| 6,643,610 B1 | 11/2003 | Kleven et al. ................. 702/183 |
| 6,651,512 B1 | 11/2003 | Kleven et al. ............... 73/861.22 |
| 6,658,945 B1 | 12/2003 | Kleven ....................... 73/861.22 |
| 6,725,731 B2 | 4/2004 | Wiklund et al. ............ 73/861.52 |
| 6,935,156 B2 | 8/2005 | Broden et al. .................. 73/1.57 |
| 2004/0177703 A1 | 9/2004 | Schumacher et al. ...... 73/861.52 |
| 2005/0210340 A1* | 9/2005 | Townsend et al. ............ 714/701 |
| 2009/0211368 A1 | 8/2009 | Garnett et al. ............ 73/861.22 |
| 2010/0082122 A1 | 4/2010 | Davis et al. ..................... 700/30 |
| 2011/0022979 A1 | 1/2011 | Meier et al. ................... 715/810 |

FOREIGN PATENT DOCUMENTS

| | | |
|---|---|---|
| JP | 07-159208 | 6/1995 |
| JP | 2001-082991 | 3/2001 |
| JP | 2004-020523 | 1/2004 |

OTHER PUBLICATIONS

International Search Report and Written Opinion for application No. PCT/US2009/062177, dated Feb. 3, 2010.

EPO Communication pursuant to Rules 161 and 162 EPC from European patent application No. 09748192.3 dated Jun. 6, 2011.

First Office Action from corresponding Japanese patent application No. 2011534674, dated Aug. 28, 2012.

Rejection Decision from corresponding Chinese patent application No. 200980142721.3, dated Oct. 30, 2012.

EP Communication from EP 09748192.3, dated Jun. 13, 2013.

* cited by examiner

MULTIVARIABLE PROCESS FLUID FLOW DEVICE WITH FAST RESPONSE FLOW CALCULATION

CROSS-REFERENCE TO RELATED APPLICATION

The present application is based on and claims the benefit of U.S. provisional patent application Ser. No. 61/108,625, filed Oct. 27, 2008, the content of which is hereby incorporated by reference in its entirety.

BACKGROUND

In industrial settings, control systems are used to monitor and control inventories of industrial and chemical processes and the like. Typically, the control system performs these functions using field devices distributed at key locations in the industrial process coupled to the control circuitry in the control room by a process control loop. The term "field device" refers to any device that performs a function in a distributed control or process monitoring system used in the measurement, control, and monitoring of industrial processes. Typically, field devices are characterized by their ability to operate outdoors for extended periods of time, such as years. Thus, a field device is able to operate in a variety of climatological extremes, including severe temperature extremes and extremes in humidity. Moreover, field devices are able to function in the presence of significant vibration, such as vibration from adjacent machinery. Further, field devices may also operate in the presence of electromagnetic interference.

One example of a field device is a multivariable process fluid flow device, such as that sold under the trade designation Model 3051 SMV Multivariable Transmitter by Emerson Process Management of Chanhassen, Minn. Multivariable process fluid flow devices can compute mass flow rate through differential producers for liquids and gases.

For differential producers, the mass flow rate is given by the following equation:

$$Q_m = N \times C_d \times Ed^2 \times Y_1 \times \sqrt{\rho} \times \sqrt{\Delta P} \qquad \text{Eq. 1}$$

The following nomenclature is generally accepted with respect to the flow equation:
$Q_m$=mass flow rate (mass/time)
$Q_E$=energy flow rate (energy/time)
$Q_V$=volumetric flow rate (length$^3$/time)
P=static pressure (force/length$^2$)
T=temperature (degrees)
$\Delta P$=differential pressure across the primary element (force/length2)
N=units conversion factor (units vary)
$C_d$=primary element discharge coefficient (dimensionless)
d=primary element throat diameter (length)
D=pipe diameter (length)
E=velocity approach factor, $(1/(1-(d/D)^4)^{1/2})$ (dimensionless)
$Y_1$=gas expansion factor, =1.0 for liquids (dimensionless)
$\rho$=fluid density (mass/length$^3$)
$\mu$=fluid viscosity (mass/length-time)
$R_D$=pipe Reynolds number (dimensionless)
H=enthalpy (energy/mass)

Many of the flow quantities are dependent on other quantities. For example, the discharge coefficient $C_d$ is a function of the Reynolds number. The Reynolds number is a function of the mass flow rate, the fluid viscosity and the pipe diameter. The thermal expansion effect $Ed^2$ is a function of temperature. The gas expansion factor, $Y_1$, is a function of differential pressure $\Delta P$ divided by the static pressure. Fluid density $\rho$ and the compressibility factor Z are functions of static pressure and temperature. Fluid viscosity $\mu$ is a function of temperature. Enthalpy, H, is a function of static pressure and temperature.

As a result of the complexities and inter-related dependencies of the flow equation, the calculation of the flow rate has generally required some sort of iterative algorithm. One way of approaching this is to use the direct substitution approach outlined in AGA Report No. 3, Part 4 where it states that the first step is to guess a discharge coefficient value. Then the flow rate or Reynolds number is solved based on a set of static pressure (P), differential pressure (DP), and temperature (T) values. Using the resulting Reynolds number, a new discharge coefficient value is calculated and compared with the initial guess. If the result of this comparison is within a predefined limit, the newly calculated discharge coefficient is assumed to be the final value. If not, a new value of Reynolds number is calculated, followed by a new discharge coefficient value which are compared with the previous values. This process is repeated until the result of successive calculations of the discharged coefficient is within the predefined tolerance. This whole process, including the initial guess, is then repeated for the next set of pressure, differential pressure, and temperature values. This approach has the advantage of being simple to program. Its main disadvantage is the potentially large number of iterations required to reach a converged solution of the flow equation.

An alternative approach, again outlined in AGA Report No. 3, is to use a more sophisticated algorithm such as the Newton-Raphson algorithm. The overall approach still requires starting with an initial guess but the Newton-Raphson algorithm, which requires additional computations, converges more rapidly than the direct substitution method. The disadvantage of this approach is the additional computations required. Existing multivariable transmitters, including the 3095MV, use some version of the algorithms described above.

Both of the techniques described above require some form of iteration and convergence within a specified limit before the flow output is solved. Consequently, the overall time required to solve the flow computation, and subsequently provide the flow output, can be a number of iterations. Existing devices are generally able to provide a flow output value on the order of every 400 milliseconds. In controlling the flow of process fluids, any delay in providing a process fluid value, such as flow, can add instability or other deleterious effects to the overall process fluid control. Accordingly, there is a need to provide process fluid flow values, such as mass flow, volumetric flow, and energy flow as quickly as possible.

Two-wire field transmitters operating on limited power budgets generally need to minimize the computations. The power budget limitation is due to the desire for process devices to operable solely from power received through a process communication loop. The current can be as little at 3.6 mA and the voltage is generally constrained (to about 10 volts) as well. The current can actually be slightly less than 3.6 mA if digital signaling (such as that in accordance with the Highway Addressable Remote Transducer protocol) is used. Accordingly, process fluid flow transmitters are generally required to be operable on as little 30 milliwatts. Consequently, the general approach is to use simpler computational algorithms at the expense of computational speed and overall flowmeter response.

SUMMARY

A process fluid flow device includes process communication circuitry, a processor, and measurement circuitry. The process communication circuitry is configured to communicate with at least one additional process device. The processor is coupled to the process communication circuitry and is configured to execute instructions to provide a plurality of cycles, wherein each cycle includes a number of flow-related calculations. Measurement circuitry is operably coupleable to a plurality of process variable sensors to obtain an indication of differential pressure during each cycle, and to obtain static pressure, and process fluid temperature. The processor is configured to compute a process fluid flow value using a current differential pressure sensor indication and at least one flow-related value calculated during a previous cycle. The process communication circuitry communicates the computed process fluid flow value to the at least one additional process device.

BRIEF DESCRIPTION OF THE DRAWINGS

FIG. 8b is a chart illustrating flow error of the embodiment of the present invention during the experiment shown in FIG. 8a.

DETAILED DESCRIPTION OF ILLUSTRATIVE EMBODIMENTS

Embodiments of the present invention generally stem from a utilization of the rate at which the process fluid variables change. These variables cannot change instantaneously. Typically, the process fluid temperature changes very slowly and the static pressure changes somewhat faster. Differential pressure generally changes the fastest, but is still slower than a response time of commercially available differential pressure sensors. Accordingly, the flow rate Q, and the Reynolds number $R_D$ do not change instantaneously. By using a fast differential pressure sensor update rate (on the order of 45 milliseconds) flow results are provided that track the flow accurately.

Unlike previous approaches to solving the flow equation, embodiments of the present invention are able to provide a flow output without waiting for a convergence of flow-related quantities. Embodiments described herein employ a differential pressure measurement obtained during a current measurement iteration with flow-related parameters calculated based on temperature and static pressure measured during a previous iteration. Since a previous value is required for a number of flow-related quantities, default, or start-up quantities are employed for the first cycle. By providing a flow output calculation based upon a current differential pressure sensor measurement, and previous temperature and static pressure measurements, the flow equation can be solved very quickly. Although the first flow output will likely have the most error, the speed at which the equations can be solved quickly brings the output to a highly accurate value within a few measurement cycles. For example, experiments have indicated that a fast ramp input to the flow may generate a maximum error on the order of $8\times10^{-3}$% of flow, but that the error falls dramatically within a few cycles (See FIG. 8a).

Figure 1:
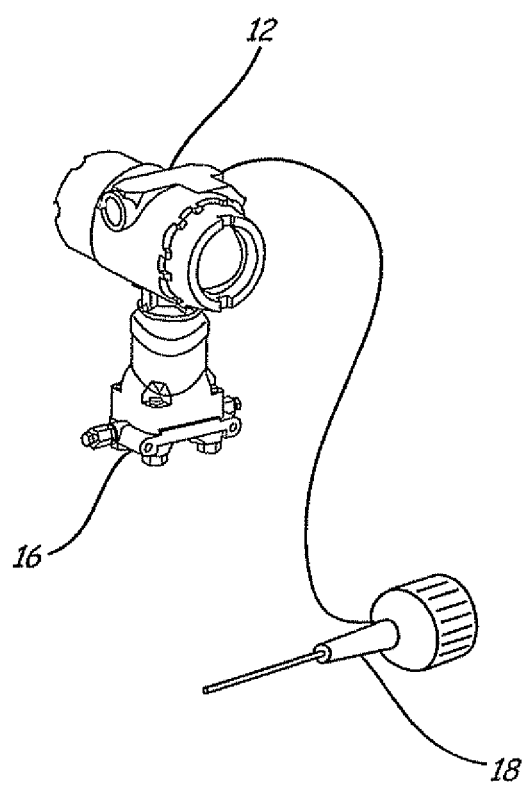
FIG. 1 is a diagrammatic view of a process fluid flow device with which embodiments of the present invention are particularly practicable.

FIG. 1 is a diagrammatic view of a multivariable process fluid flow device with which embodiments of the present invention are particularly useful. Flow device 12 is a multivariable field device that is able to measure a plurality of process fluid variables. Preferably, pressures are measured via manifold 16 and process fluid temperature is measured via temperature transducer 18. Coupled to a suitable differential pressure producer such as an orifice plate, the pressure measured on opposite sides of the orifice plate while the process fluid flows therethrough can be related to the process fluid flow rate in accordance known techniques.

Figure 2:
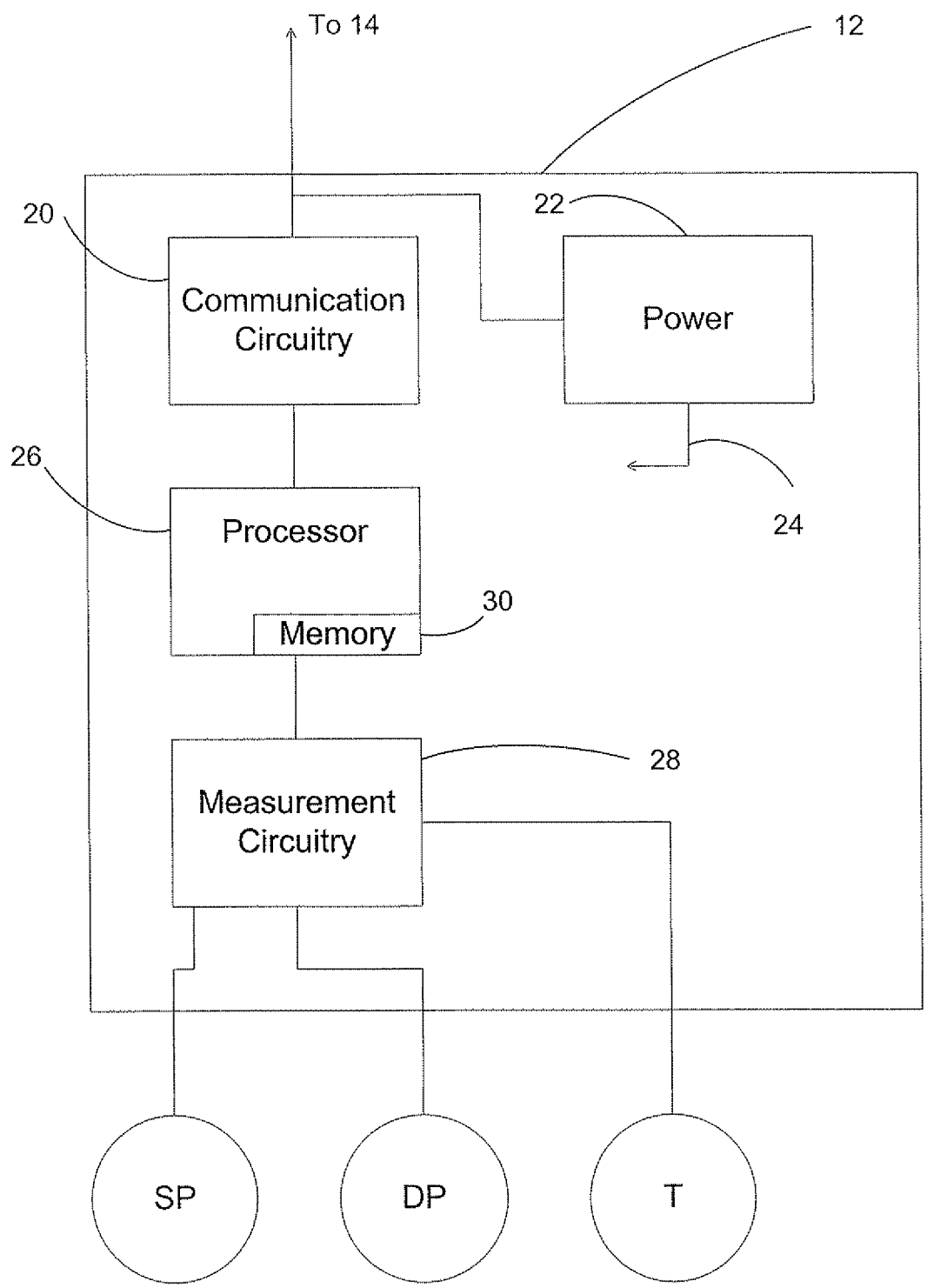
FIG. 2 is a block diagram of a process fluid flow device with which embodiments of the present invention are particularly practicable.

FIG. 2 is a block diagram of process fluid flow device 12. Device 12 includes communication circuitry 20 operably coupleable to process communication loop 14. Communication loop 14 typically uses an analog 4-20 mA signal that is used in the control system. Communication circuitry 20 allows device 12 to communicate in accordance with a suitable process industry communication protocol, such as the Highway Addressable Remote Transducer (HART®) protocol, the FOUNDATION™ Fieldbus protocol, or any other suitable wired or wireless process industry protocol. The communication provided by communication circuitry 20 allows device 12 to communicate with other process devices located in the field or in the control room. Device 12 also includes power module 22 that is preferably also coupleable to process communication loop 14. By coupling to process communication loop 14, device 12 may be able to operate wholly upon power received through the process communication loop. However, in some embodiments (such as wireless applications), power module 22 may be a power storage device, such as a battery or supercapacitor, and in such embodiments power module 22 need not couple to process communication loop 14. Power module 22 is configured to provide suitable electrical power to all components of device 12, as illustrated at reference numeral 24. In some embodiments, device 12 is operable on as little as 30 milliwatts. Further, certain low power embodiments may cycle the device between a sleep mode and a measurement mode in order to conserve power.

Device 12 also includes a processor 26 which is preferably a microprocessor that is operably coupled to communications circuitry 20 and power module 22. Microprocessor 26 executes instructions stored in memory 30 to obtain measurements from measurement circuitry 28 and calculate information based upon such measurements. For example, processor 26 preferably obtains measurements with respect to static process fluid pressure (P), differential process fluid pressure (DP), and process fluid temperature (T) and is able to provide or otherwise calculate a mass flow rate relative to process fluid flowing through a differential producer.

The update rates for the differential pressure, static pressure, and process temperature input may be the same, or may be different. Since the equation used to calculate the flow rate for differential pressure applications is directly related to the square root of differential pressure (DP), it is most important to update the DP as quickly as possible. Changes in the static pressure and process temperature affect the flow rate secondarily as changes in the fluid properties or in the values of other items in the flow equation. Since they have a less-direct effect on the flow rate, and because the static pressure and, especially, the process fluid temperature generally change more slowly than the differential pressure, the update rate for P and T can be lower than the update rate for the differential pressure. It is also acceptable that the update rate for the static pressure and process fluid temperature be the same as that of the differential pressure.

Embodiments of the present invention generally provide calculation of the flow rate prior to the next differential pressure update. The specific calculations and order of calculations are generally performed by processor 26 based upon coefficients and software instructions stored in memory 30. Embodiments of the present invention also generally advantageously employ Chebychev approximations for such terms as the discharge coefficient ($C_d$), fluid density ($\rho$), fluid viscosity, fluid enthalpy, the square root function, and the $\log_2$ function. The bracket [ ] nomenclature in the figures indicates a Chebychev curve fit approximation such as that set forth in U.S. Pat. No. 6,643,610 assigned to Rosemount Inc. Other terms are approximated using conventional polynomials. These approximations, along with the utilization of integer math are important in that they provide for fast computation of the terms using a relatively low-power, low-complexity processor 26. However, embodiments of the present invention are applicable to more powerful processors and, if the clock speed of the processor 26 is sufficiently high, the full equations for various terms could be used as long as the calculation can be completed prior to the next differential pressure sensor update.

FIGS. 3-7 provide a detailed description of one particular way in which the flow rate can be provided in accordance with an embodiment of the present invention. Reference numerals of the various blocks in FIGS. 3-7 generally indicate the order in which various calculations or steps are performed.

Figure 3:
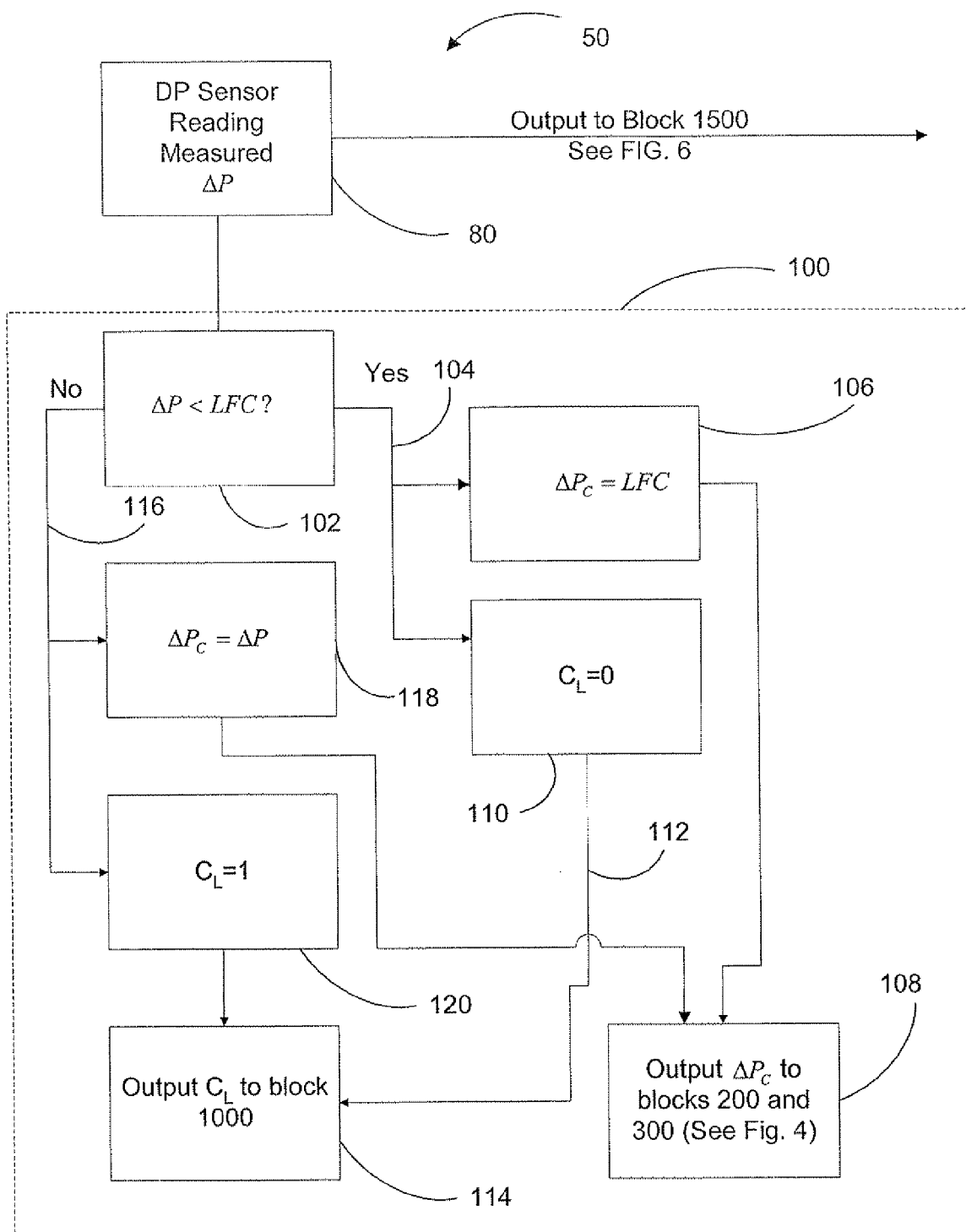
FIGS. 3-7 are portions of a single flow diagram illustrating a method for calculating process fluid flow in accordance with an embodiment of the present invention.

FIG. 3 is a diagrammatic view of a first step in method 50 for providing flow rate calculations in accordance with an embodiment of the present invention. Method 50 begins at block 80 where a differential pressure sensor reading is measured. Control then passes to block 100 and specifically block 102 within block 100. At block 102, the differential pressure sensor reading is compared to the Low Flow Cutoff (LFC). If $\Delta P$ is less than LFC, then control proceeds along line 104 where $\Delta P_C$ is set equal to LFC at block 106 and $\Delta P_C$ is provided to blocks 200 and 300 as indicated at block 108. Additionally, $C_L$ is set equal to zero which sets the flow calculation to zero, as indicated at block 110 and control then proceeds along line 112 to block 114. At block 114, the quantity $C_L$ is provided to block 1000. If $\Delta P$ is greater than or equal to the quantity LFC, then control proceeds along line 116 and block 118 and $\Delta P_C$ is set equal to the measured $\Delta P$ reading. Then this output is provided to blocks 200 and 300 through block 108. Additionally, $C_L$ is set equal to one which allows the flow rate to be non-zero, as indicated at block 120 and the $C_L$ value is provided to block 1000 as indicated at block 114. $C_L$ is a low flow parameter used by embodiments of the present invention. $C_L=0$ when the differential pressure is less than the low flow cutoff (LFC). $C_L=1$ then the differential pressure is greater than or equal to the LFC.

Figure 4:
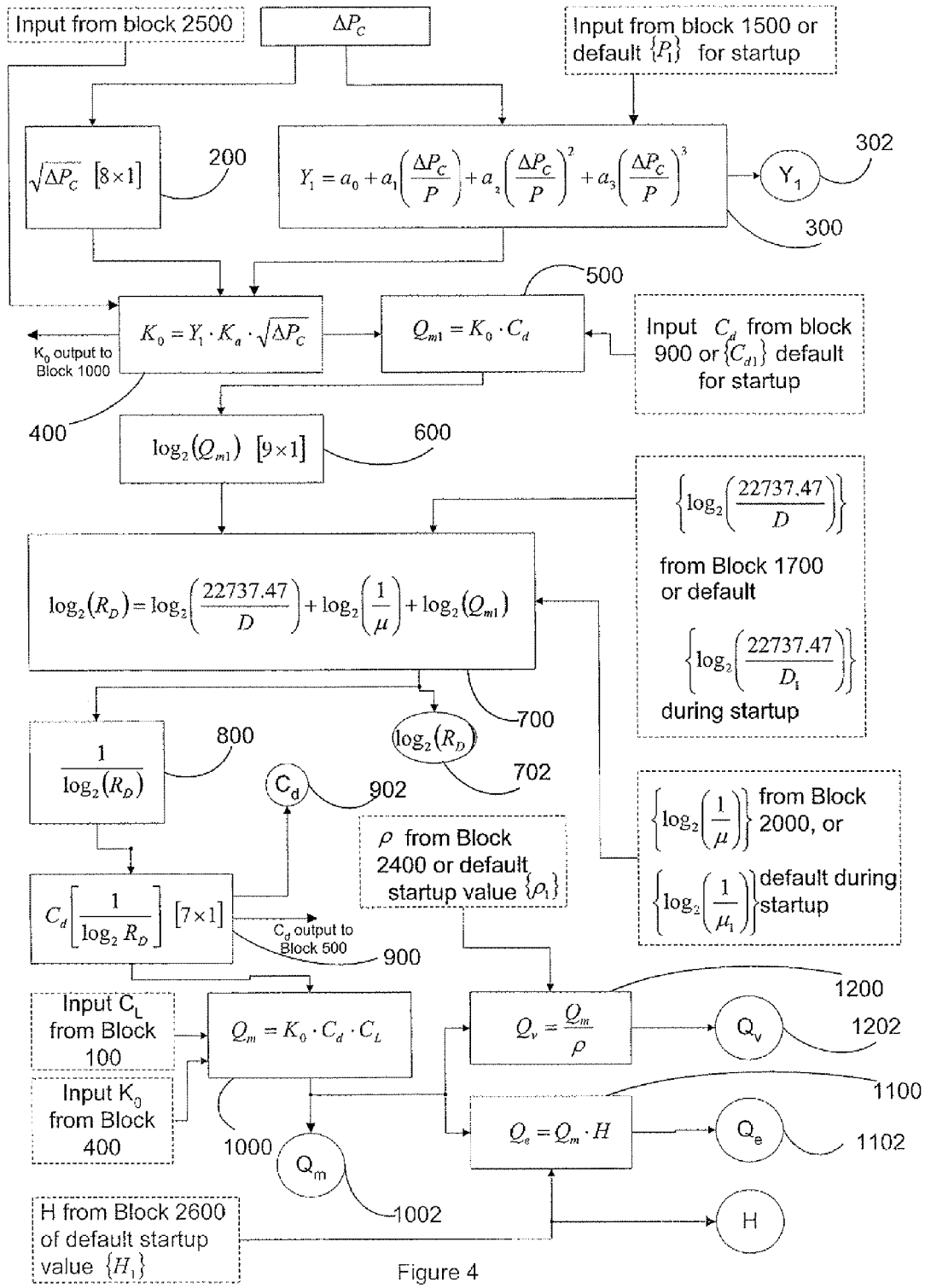

Referring to FIG. 4, blocks 200 and 300 receive the $\Delta P_C$ input provided by block 108 in FIG. 3. Block 200 employs a curve fit to estimate the square root of $\Delta P_C$. The square root quantity is then provided to block 400. Block 300 calculates the quantity $Y_1$ using $\Delta P_C$ and the static pressure. The static pressure is generally provided by block 1500 (shown in FIG. 6) but during startup, a default value $\{P_1\}$ is used. $Y_1$ is then provided as a test output at circle 302, and quantity $Y_1$ is also provided to block 400. Block 400 calculates $K_0$ as being the product of $Y_1$, $K_a$, and the square root of $\Delta P_C$. $K_a$ is an intermediate term used by embodiments of the present invention. $K_0$ (which is also an intermediate term used by embodiments of the present invention) is then provided to block 1000 and also to block 500. Block 500 calculates $Q_{m1}$ as being the product of $K_0$ and $C_d$. $C_d$ is an input that is generally received from block 900 and calculated after block 500. The previous update value of $C_d$ is used in block 500. Accordingly, during startup, a default value for $C_d$ $\{C_{d1}\}$ is used for the initial calculation of block 500 since a previous value is not available. $Q_{m1}$ is provided to block 600 where a curve fit is used to approximate $\log_2(Q_{m1})$. $\log_2$ is used since floating point numbers are represented in microprocessors with exponents of base 2. This to value is then provided to block 700 along with inputs from block 1700 and block 2000. Since, during initial startup, blocks 1700 and 2000 have not yet executed, initial default values are provided during startup. Block 700 calculates the log of $R_D$ and provides the value as a test output at circle 702. The value calculated at block 700 is then inverted at block 800 and provided as an input to block 900. Block 900 estimates the discharge coefficient $C_d$ based upon the input provided by block 800 and a curve fit. The discharge coefficient is provided back to block 500 and also as an input to block 1000 and as a test value at circle 902. Block 1000 calculates mass flow rate $Q_m$, as the product of $K_0$, $C_d$, and $C_L$. $Q_m$ is then provided as a test value at circle 1002 and as an input to blocks 1100 and 1200. Block 1100 calculates energy flow rate $Q_e$ as product of $Q_m$ and H. $Q_e$ is provided as a test value at circle 1102. Similarly, block 1200 calculates volumetric flow rate $Q_v$ as the quotient of $Q_m$ and $\rho$. $Q_v$ is also provided as a test value at circle 1202. The quantities $Q_m$, $Q_e$, and $Q_v$ are later used and provided to a totalizer as will be described in further detail with respect to FIG. 5.

Figure 5:
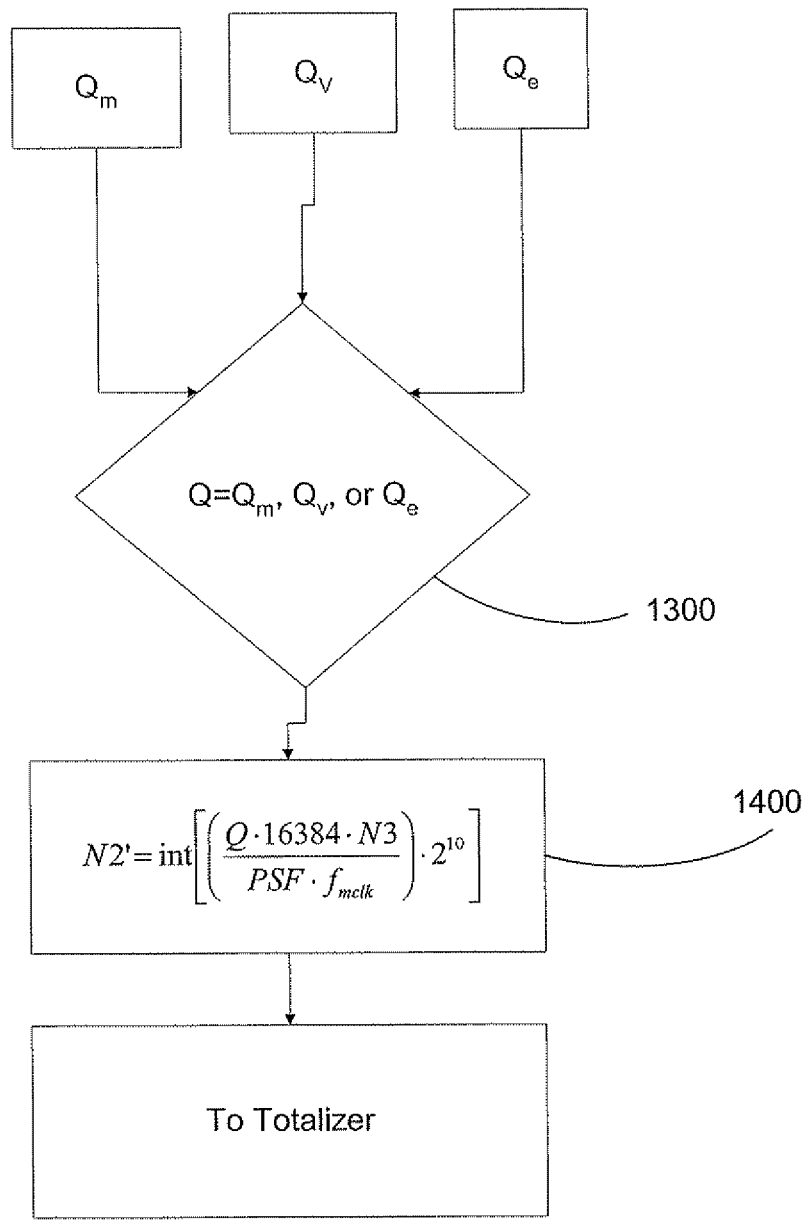

FIG. 5 illustrates additional steps for the method of calculating fluid flow in accordance with an embodiment of the present invention. The method continues at block 1300 which takes as inputs the values $Q_m$, $Q_v$, and $Q_e$ calculated in blocks 1000, 1200, and 1100, respectively. Q equals $Q_m$, $Q_v$ or $Q_e$, as appropriate. The value for Q is passed to block 1400 which calculates N2' and provides that value to the totalizer, a special circuit that sums frequency cycles where N2' sets the frequency. All of the steps and calculations illustrated in FIGS. 4 and 5 are performed and completed before the next differential pressure sensor measurement update is available. Additional steps and calculations with respect to FIGS. 6 and 7 allow the effects of static pressure and process temperature to be calculated. Characterizing and/or compensating for these various effects improves the value of the process fluid measurement. As set forth above, the update rates for the absolute pressure and process temperature need to be as fast as that of the differential pressure.

Figure 6:
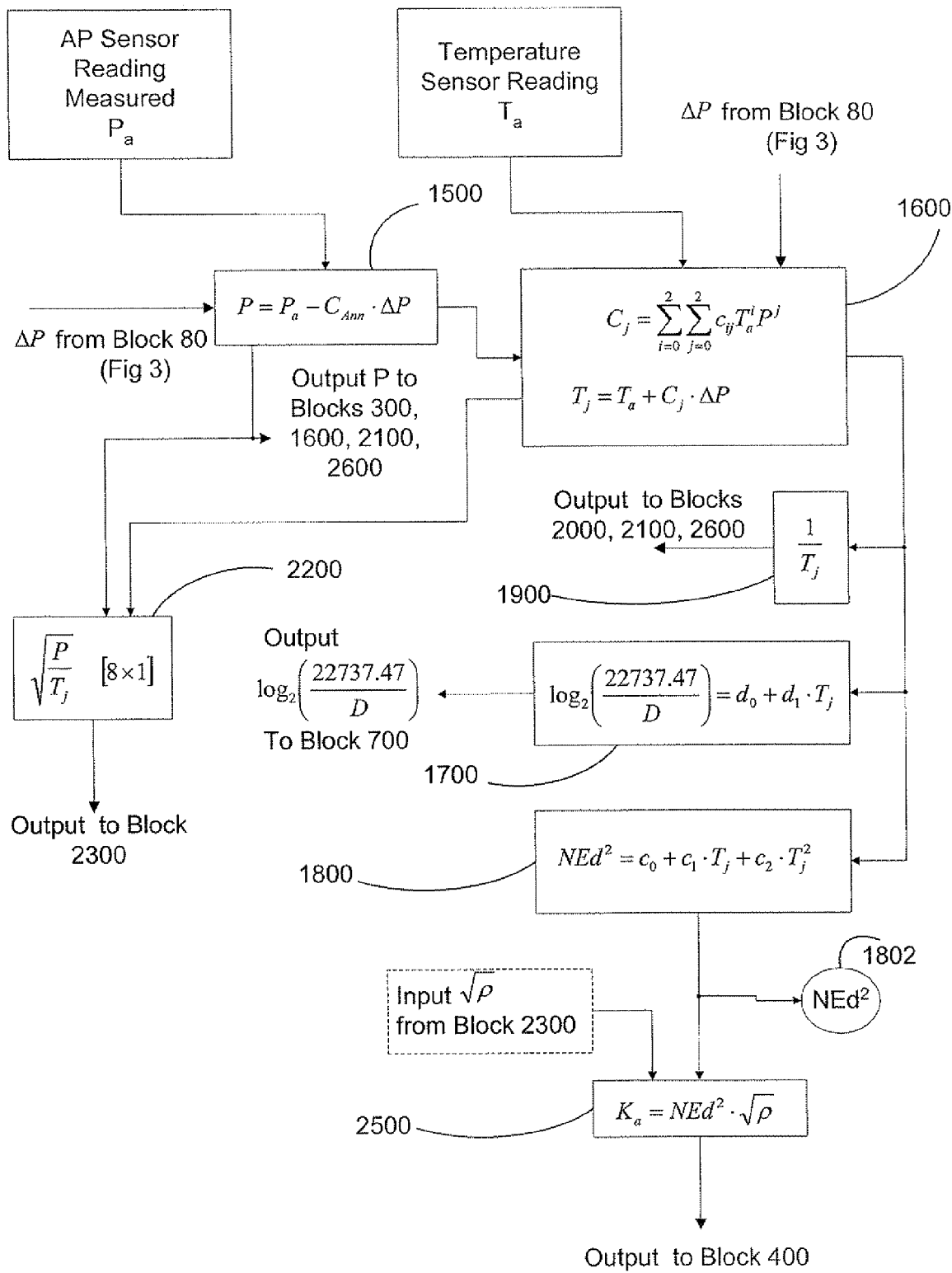

FIG. 6 illustrates the static pressure reading being measured and provided (as $P_a$) to block 1500. Block 1500 also receives, as an input, the differential pressure sensor measurement $\Delta P$ and calculates P, which is then provided to blocks 300, 1600, 2100, and 2600. $C_{Ann}$ illustrated in block 1500 is a dimensionless correction term for averaging picot primary elements. The temperature sensor reading $T_a$ is also obtained and provided to block 1600 along with differential pressure $\Delta P$ from block 80 in FIG. 3. Block 1600 calculates $C_j$ and $T_j$. $C_j$ is the Joule-Thomson correction test in degrees/$\Delta P$. The output from block 1600 is provided to blocks 2200, 1900, 1700, and 1800. Block 1900 provides the quantity $1/T_j$ to blocks 2000, 2100, and 2600. Block 1700 calculates $\log_2 (22737.47/D)$ based upon $d_0$ plus $d_1$ and $T_j$ (provided from block 1600). The constant 22737.47 in Block 1700 comes from the use of psia for pressure units, Degrees F. for temperature units, inches for length units, pounds-mass per second for mass flow units, centipoise for viscosity units and the particular representation of the expression for Reynolds number. The output from block 1700 is provided to block 700.

Block 1800 calculates $NEd^2$ based upon the input from block 1600. The output from block 1800 is provided to block 2500, and also provided as a test value at circle 1802. Block 2200 calculates the square root of $P/T_j$ based upon a curve fit. The output of block 2200 is provided as an input to block 2300, described with respect to FIG. 7. Block 2500 calculates $K_a$ based upon the output from block 1800 and $\rho$ provided by block 2300. The output, $K_a$, of block 2500 is provided to block 400.

Figure 7:
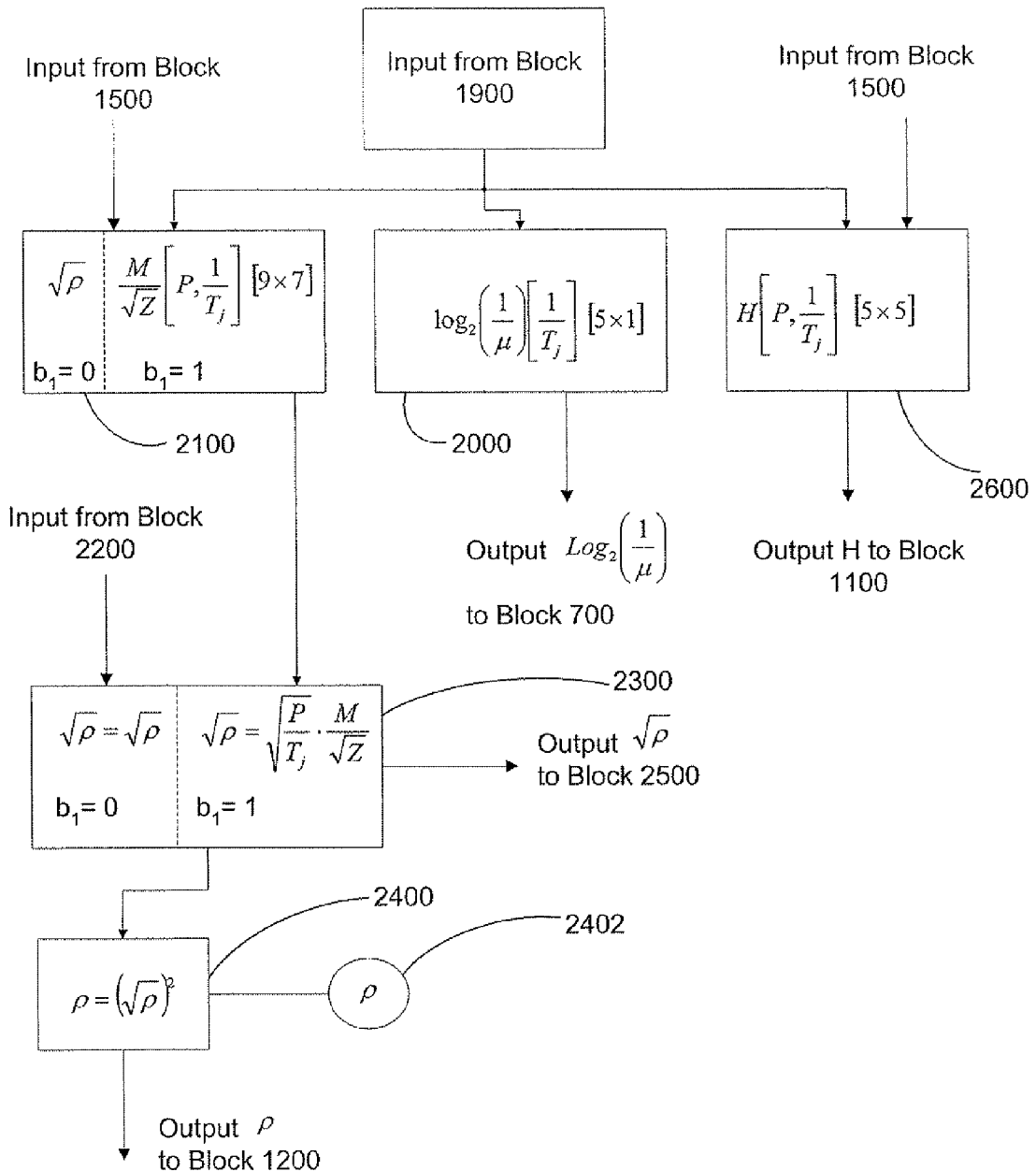

FIG. 7 illustrates a number of steps and calculations in accordance with the embodiment described with respect to FIGS. 3-6. Block 2100 receives, as an input, $1/T_j$ from block 1900, and also receives P from block 1500. If $b_1$ equals zero, indicating a liquid, block 2100 merely provides the square root of $\rho$ to block 2300. If $b_1$ equals one, indicating a gas, block 2100 calculates $(M/\sqrt{Z})$ as the curve fit approximation using P and $1/T_j$. Preferably, the approximation is a Chebychev approximation using 9×7 coefficients. The output from block 2100 is provided to block 2300. Block 2000 receives its input from block 1900 and calculates $\log_2(1/\rho)$ as a curve fit of $1/T_j$. Preferably, the curve fit is performed using approximately five coefficients. The output from block 2000 is provided to block 700. Block 2600 estimates H as a function of P, received from block 1500, and $1/T_j$, received from block 1900. H is preferably estimated using a Chebychev approximation of 5×5 coefficients. The output from block 2600 is provided to block 1100. Block 2300 receives its input from block 2200 and block 2100, and provides the square root of $\rho$ as its output to blocks 2400 and 2500. Block 2400 squares the square root of $\rho$ to provide $\rho$ as a test value at circle 2402 and as an output to block 1200.

Figure 8A:
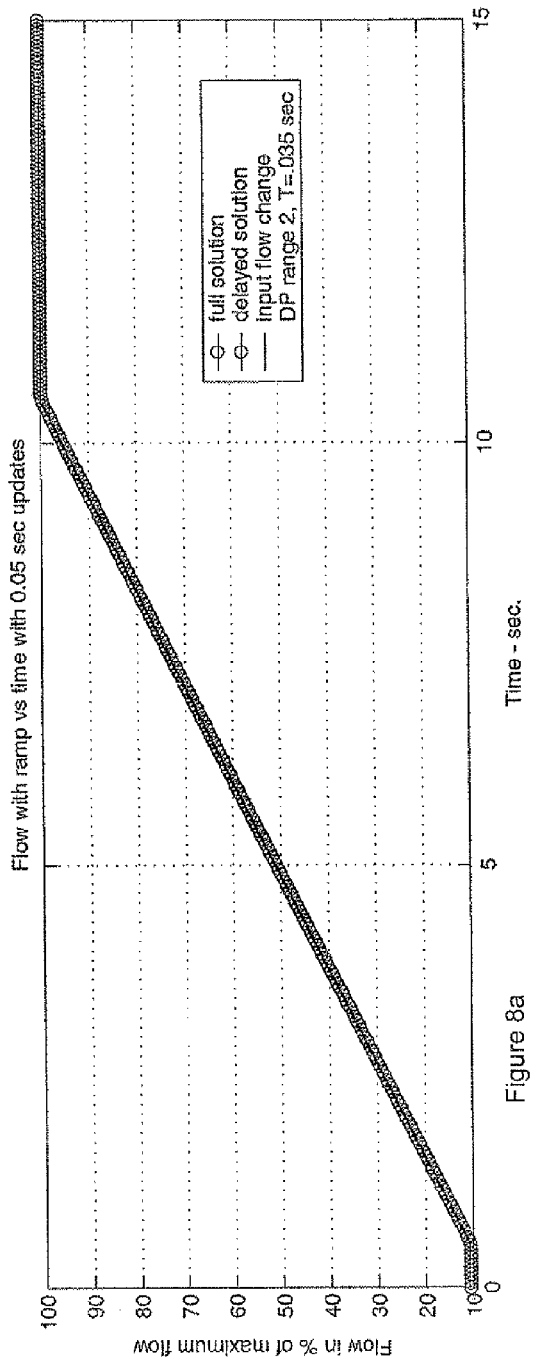
FIG. 8a is a chart of flow with ramp versus time illustrating the similarity in output between a delayed solution (in accordance with an embodiment of the present invention) and a full solution of the flow equation in accordance with known iterative techniques.

FIG. 8a is a chart of flow with ramp versus time illustrating the similarity in output between a delayed solution (in accordance with an embodiment of the present invention) and a full solution of the flow equation in accordance with known iterative techniques. Although the key in FIG. 8a shows both the delayed solution and the full solution as being plotted with circles, it is apparent from the figure that all circles are grouped so closely during the ramp as to be indistinguishable between the full solution and the delayed solution. As shown in FIG. 8a, at a time beginning slightly before the first second, the flow is ramped from the 10% value to a 100% flow value slightly after the 10 second mark.

Figure 8B:
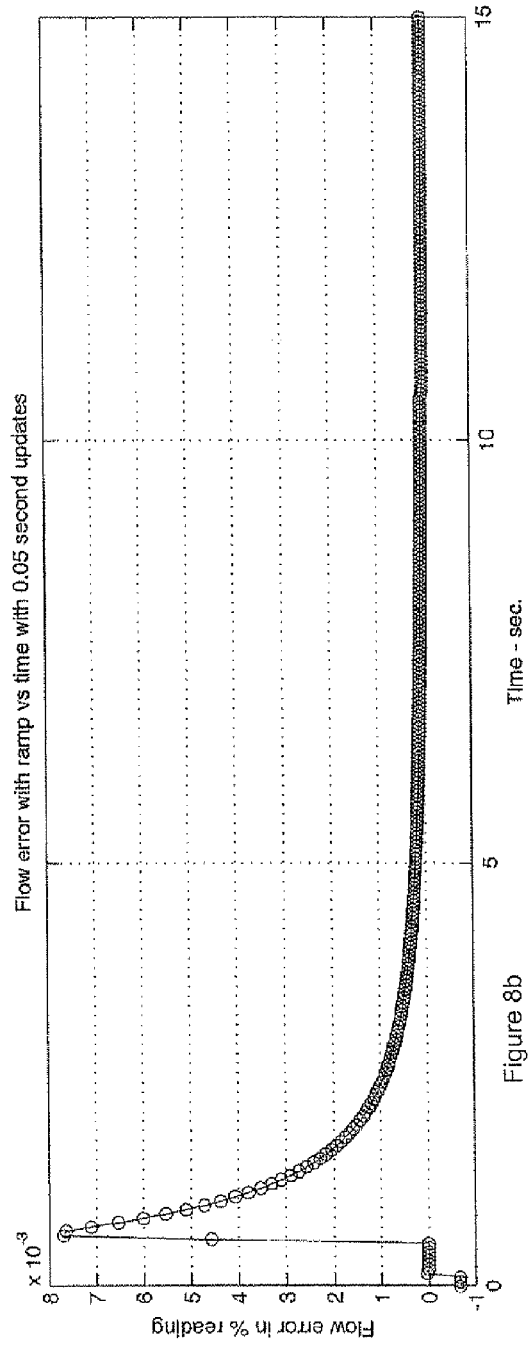

FIG. 8b is a chart illustrating flow error of the embodiment of the present invention during the experiment shown in FIG. 8a. FIG. 8b shows that the maximum error is slightly less than $8.0 \times 10^{-3}\%$ of flow and that the error occurs almost immediately with the onset of the ramp change. However, the error quickly decays to less than $1 \times 10^{-3}$ of flow at approximately 2.5 seconds.

The embodiment described herein generally allows calculation of the flow rate very quickly and does not require an indefinite amount of time waiting for convergence. By using flow related values calculated during a previous measurement cycle in combination with a current differential pressure sensor reading, the error quickly abates and the flow output achieves a highly accurate value very quickly. The techniques disclosed herein provide significant efficiency when considering the response of the process variables and the sampling rate of the sensors. Process variables, even differential pressure, are not able to change instantaneously. The response time of the sensors also limits how quickly process variables can be read. Embodiments of the present invention provide a flow output for each successive reading by using one or more sensor readings from at least one previous measurement cycle. Additionally, embodiments of the present invention also generally advantageously employ Chebychev approximations for such terms as the discharge coefficient ($C_d$), fluid density ($\rho$), fluid viscosity, and fluid enthalpy. Other terms are approximated using conventional polynomials. These approximations, along with the utilization of integer math are important in that they provide for fast computation of the terms using a relatively low-power, low-complexity processor.

Although the present invention has been described with reference to preferred embodiments, workers skilled in the art will recognize that changes may be made in form and detail without departing from the spirit and scope of the invention.

What is claimed is:

1. A process fluid flow device comprising:
   process communication circuitry coupleable to a process communication loop;
   a processor coupled to the process communication circuitry and configured to execute instructions to provide a plurality of cycles, wherein each cycle includes a number of flow-related calculations;
   measurement circuitry operably coupleable to a plurality of process variable sensors to obtain an indication of differential pressure during each cycle, and at least one of static pressure and process fluid temperature;
   wherein the processor is configured to compute a process fluid flow value during a first cycle using a current differential pressure sensor indication and at least one flow-related startup value stored in the process fluid flow device;
   wherein the process communication circuitry communicates the computed process fluid flow value over a process communication loop; and
   wherein a differential pressure update rate is faster than a process fluid temperature update rate.

2. The process fluid flow device of claim 1, wherein the processor is configured to calculate a process fluid flow value during a cycle using a current differential pressure sensor indication and at least one flow-related value calculated during a previous cycle.

3. The process fluid flow device of claim 1, wherein the processor is operably coupled to memory containing a number of coefficients for a curve fit approximation for at least one flow-related quantity.

4. The process fluid flow device of claim 3, wherein at least some of the coefficients are coefficients for a Chebychev curve fit.

5. The process fluid flow device of claim 4, wherein the processor approximates at least one flow-related quantity using floating point and integer math.

6. The process fluid flow device of claim 1, wherein the processor computes the process fluid flow value before obtaining the static pressure indication.

7. The process fluid flow device of claim 1, wherein the processor is configured to calculate the process fluid flow value within approximately 50 milliseconds of obtaining the indication of differential pressure.

8. The process fluid flow device of claim 1, wherein the processor is configured to alternate between a low power sleep mode and a measurement mode to conserve power.

9. The process fluid flow device of claim 1, wherein the process fluid flow device is configured to operate wholly upon power received from the process communication loop.

10. The process fluid flow device of claim 1, wherein the process fluid flow device is operable on 30 milliwatts.

11. The process fluid flow device of claim 1, wherein the process fluid flow value is process fluid mass flow.

12. The process fluid flow device of claim 1, wherein the process fluid flow value is volumetric process fluid flow.

13. The process fluid flow device of claim 1, wherein the indication of static pressure and process fluid temperature are obtained during each cycle.

14. A process fluid flow device comprising:
process communication circuitry configured to communicate with at least one additional process device;
a processor coupled to the process communication circuitry and configured to execute instructions to provide a plurality of cycles, during each of which a fluid flow value is calculated, wherein each cycle includes a number of flow-related calculations; and
measurement circuitry operably coupleable to a plurality of process variable sensors to obtain an indication of differential pressure during each cycle, static pressure, and process fluid temperature;
wherein:
the processor is configured to compute the process fluid flow value using a current differential pressure sensor indication and at least one flow-related value calculated during a previous cycle; and
the process communication circuitry communicates the computed process fluid flow value to the at least one additional process device.

15. The process fluid flow device of claim 14, and further comprising a power module configured to power the process fluid device.

16. The process fluid flow device of claim 15, wherein process fluid flow device provides the process fluid flow value within 45 milliseconds of obtaining the indication of differential pressure and wherein the power module supports low power operation on 30 milliwatts or less.

17. The process fluid flow device of claim 15, wherein the processor is configured to alternate between a low power sleep mode and a measurement mode.

18. The process fluid flow device of claim 14, wherein the process communication circuitry communicates wirelessly.

19. The process fluid flow device of claim 14, wherein the processor is operably coupled to memory containing a number of coefficients for a curve fit approximation for at least one flow-related quantity.

20. The process fluid flow device of claim 19, wherein at least some of the coefficients are coefficients for a Chebychev curve fit.

21. The process fluid flow device of claim 20, wherein the processor approximates at least one flow-related quantity using floating point and integer math.

22. A method for providing a process fluid flow value with a process fluid flow device, the method comprising:
cyclically providing a number of flow-related calculations;
obtaining an indication of differential pressure during each cycle, and at least one of static pressure and process fluid temperature;
computing a process fluid flow value during each cycle using a current differential pressure sensor indication and at least one flow-related value calculated during a previous cycle; and
communicating the computed process fluid flow value to at least one additional process device.

23. The method of claim 22, wherein the computed process fluid flow value is communicated within 45 milliseconds of obtaining the indication of differential pressure.

24. The method of claim 23, wherein the process fluid flow device does not consume more than 30 milliwatts during execution of the method.

25. The method of claim 22, and further comprising calculating, during a current cycle, a flow-related parameter to use during a subsequent cycle.

26. The method of claim 25, wherein calculating the flow-related parameter to use during a subsequent cycle is performed after the process fluid flow value is communicated.

* * * * *